(12) United States Patent
Li

(10) Patent No.: US 10,785,241 B2
(45) Date of Patent: Sep. 22, 2020

(54) URL ATTACK DETECTION METHOD AND APPARATUS, AND ELECTRONIC DEVICE

(71) Applicant: Alibaba Group Holding Limited, George Town (KY)

(72) Inventor: Longfei Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/802,147

(22) Filed: Feb. 26, 2020

(65) Prior Publication Data
US 2020/0195667 A1    Jun. 18, 2020

Related U.S. Application Data

(63) Continuation of application No. PCT/CN2018/116100, filed on Nov. 19, 2018.

(30) Foreign Application Priority Data

Dec. 28, 2017    (CN) .......................... 2017 1 1463325

(51) Int. Cl.
H04L 29/06    (2006.01)
G06N 20/00    (2019.01)
(Continued)

(52) U.S. Cl.
CPC ......... H04L 63/1416 (2013.01); G06N 20/00 (2019.01); G06F 21/55 (2013.01);
(Continued)

(58) Field of Classification Search
CPC ..... H04L 63/1416; H04L 29/06; G06F 30/27; G06F 21/55; G06F 21/56; G06N 20/00; G06N 20/20
See application file for complete search history.

(56) References Cited

U.S. PATENT DOCUMENTS 9,491,187 B2 *  11/2016  Sridhara ............. H04L 63/1408
9,838,407 B1 *  12/2017  Oprea ................. H04L 63/1425
(Continued)

FOREIGN PATENT DOCUMENTS

CN    104537303    4/2015
CN    104735074    6/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

Primary Examiner — Jayesh M Jhaveri
(74) Attorney, Agent, or Firm — Fish & Richardson P.C.

(57) ABSTRACT

Features of multiple dimensions are extracted from information included in a URL access request. A risk score of the URL access request is obtained by providing the features to a predetermined URL attack detection model for prediction calculation, where the predetermined URL attack detection model is a machine learning model obtained through training based on the Isolation Forest machine learning algorithm. It is determined, based on the risk score, that the URL access request is a URL attack request.

15 Claims, 4 Drawing Sheets

(51) Int. Cl.
*G06N 20/20* (2019.01)
*G06F 21/55* (2013.01)
*G06F 21/56* (2013.01)
*G06F 30/27* (2020.01)

(52) U.S. Cl.
CPC .............. *G06F 21/56* (2013.01); *G06F 30/27* (2020.01); *G06N 20/20* (2019.01)

(56) References Cited

U.S. PATENT DOCUMENTS

| | | | |
|---|---|---|---|
| 10,601,852 | B2* | 3/2020 | Takahashi .............. G07C 5/008 |
| 2009/0281981 | A1 | 11/2009 | Chen et al. |
| 2011/0185425 | A1 | 7/2011 | Lee et al. |
| 2012/0158626 | A1* | 6/2012 | Zhu ..................... H04L 63/1408 706/13 |
| 2014/0298460 | A1* | 10/2014 | Xue ................... H04L 63/1425 726/23 |
| 2016/0028762 | A1 | 1/2016 | Di Pietro et al. |
| 2017/0169360 | A1* | 6/2017 | Veeramachaneni ......................... G06N 3/0454 |
| 2017/0372071 | A1* | 12/2017 | Saxe ...................... G06F 21/562 |
| 2018/0276564 | A1* | 9/2018 | Varma .................. G06K 9/6282 |
| 2020/0034752 | A1* | 1/2020 | Luo ......................... H04L 51/22 |

FOREIGN PATENT DOCUMENTS

| | | |
|---|---|---|
| CN | 105357221 | 2/2016 |
| CN | 106341377 | 1/2017 |
| CN | 106789888 | 5/2017 |
| CN | 106960358 | 7/2017 |
| CN | 107346388 | 11/2017 |
| CN | 107577945 | 1/2018 |
| CN | 107992741 | 5/2018 |
| CN | 108111489 | 6/2018 |
| CN | 108229156 | 6/2018 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2018/116,100, dated Feb. 18, 2020, 12 pages (With Partial English Translation).
Extended European Search Report in European Application No. 18893619.9, dated Jun. 9, 2020, 7 pages.
PCT International Preliminary Report on Patentability in International Application No. PCT/CN2018/116100, dated Jun. 30, 2020, 10 pages (with English translation).

* cited by examiner

URL ATTACK DETECTION METHOD AND APPARATUS, AND ELECTRONIC DEVICE

CROSS-REFERENCE TO RELATED APPLICATIONS

This application is a continuation of PCT Application No. PCT/CN2018/116100, filed on Nov. 19, 2018, which claims priority to Chinese Patent Application No. 201711463325.3, filed on Dec. 28, 2017, and each application is hereby incorporated by reference in its entirety.

TECHNICAL FIELD

The present specification relates to the field of computer applications, and in particular, to a URL attack detection method and apparatus, and an electronic device.

BACKGROUND

In the Internet application scenario, a large quantity of URL access requests are generated daily. Among the large quantity of URL access requests, there are also URL attacks that lawbreakers attempt to initiate by using illegal URL access requests. For example, common URL attacks include Trojan horse attacks, SQL injection attacks, cross site scripting (XSS) attacks, etc. This type of illegal URL access request usually differs from an ordinary URL access request to a certain extent. Therefore, it is important to quickly identify and detect URL attacks initiated by illegal users while constructing an online system.

SUMMARY

The present specification provides a URL attack detection method, including: extracting features of multiple dimensions from information included in a URL access request; entering the extracted features to a predetermined URL attack detection model for prediction calculation to obtain a risk score of the URL access request, where the URL attack detection model is a machine learning model obtained through training based on the Isolation Forest machine learning algorithm; and determining whether the URL access request is a URL attack request based on the risk score.

Optionally, the method further includes: separately extracting features of multiple dimensions from information included in multiple URL access request samples, where none of the multiple URL access request samples are labeled with a sample label; constructing multiple training samples based on the extracted features; and training using the multiple training samples based on the Isolation Forest machine learning algorithm to obtain the URL attack detection model.

Optionally, the URL attack detection model includes M random binary trees obtained through training based on the Isolation Forest machine learning algorithm; and the training using the multiple training samples based on the Isolation Forest machine learning algorithm to obtain the URL attack detection model includes: constructing M training sample subsets based on training samples uniformly sampled from the multiple training samples; randomly selecting a classification feature for each training sample subset from the features of the multiple dimensions as a root node, and randomly selecting a classification threshold value for each training sample subset from a value range between the maximum value and the minimum value of the classification feature; separately classifying training samples whose values of the classification feature are greater than the classification threshold value and training samples whose values of the classification feature are less than the classification threshold value in each training sample set under leaf nodes of the root node; and using training samples in each leaf node as a new training sample subset to iteratively execute the above classification process until training samples in each obtained leaf node are no longer classifiable.

Optionally, the entering the extracted features to a predetermined URL attack detection model for prediction calculation to obtain a risk score of the URL access request includes: constructing a prediction sample based on the extracted features; traversing each random binary tree from a root node based on a value of each feature in the prediction sample to find a leaf node corresponding to the prediction sample; and calculating an average value of path depths of found leaf nodes in all the random binary trees, and normalizing the average value to obtain the risk score of the URL access request.

Optionally, the information includes domain name information and/or a URL parameter; and the features of the multiple dimensions include features extracted from the domain name information included in the URL access request and/or features extracted from the URL parameter included in the URL access request.

Optionally, the features include a combination of multiple of the following features: a total quantity of characters, a total quantity of letters, a total quantity of numbers, a total quantity of symbols, a quantity of different characters, a quantity of different letters, a quantity of different numbers, and a quantity of different symbols.

The present specification further provides a URL attack detection apparatus, including: a first extraction module, configured to extract features of multiple dimensions from information included in a URL access request; a calculation module, configured to enter the extracted features to a predetermined URL attack detection model for prediction calculation to obtain a risk score of the URL access request, where the URL attack detection model is a machine learning model obtained through training based on the Isolation Forest machine learning algorithm; and a determining module, configured to determine whether the URL access request is a URL attack request based on the risk score.

Optionally, the apparatus further includes: a second extraction module, configured to separately extract features of multiple dimensions from information included in multiple URL access request samples, where none of the multiple URL access request samples are labeled with a sample label; a construction module, configured to construct multiple training samples based on the extracted features; and a training module, configured to train using the multiple training samples based on the Isolation Forest machine learning algorithm to obtain the URL attack detection model.

Optionally, the URL attack detection model includes M random binary trees obtained through training based on the Isolation Forest machine learning algorithm; and the training module is configured to: construct M training sample subsets based on training samples uniformly sampled from the multiple training samples; randomly select a classification feature for each training sample subset from the features of the multiple dimensions as a root node, and randomly select a classification threshold value for each training sample subset from a value range between the maximum value and the minimum value of the classification feature; separately classify training samples whose values of the classification feature are greater than the classification threshold value and training samples whose values of the classification feature are less than the classification threshold value in each training sample set under leaf nodes of the root node; and use training samples in each leaf node as a new training sample subset to iteratively execute the above classification process until training samples in each obtained leaf node are no longer classifiable.

Optionally, the calculation module is configured to: construct a prediction sample based on the extracted features; traverse each random binary tree from a root node based on a value of each feature in the prediction sample to find a leaf node corresponding to the prediction sample; and calculate an average value of path depths of found leaf nodes in all the random binary trees, and normalize the average value to obtain the risk score of the URL access request.

Optionally, the information includes domain name information and/or a URL parameter; and the features of the multiple dimensions include features extracted from the domain name information included in the URL access request and/or features extracted from the URL parameter included in the URL access request.

Optionally, the features include a combination of multiple of the following features: a total quantity of characters, a total quantity of letters, a total quantity of numbers, a total quantity of symbols, a quantity of different characters, a quantity of different letters, a quantity of different numbers, and a quantity of different symbols.

The present specification further provides an electronic device, including: a processor; and a memory, configured to store a machine executable instruction, where by reading and executing a machine executable instruction that corresponds to control logic of URL attack detection and that is stored in the memory, the processor is prompted to: extract features of multiple dimensions from information included in a URL access request; enter the extracted features to a predetermined URL attack detection model for prediction calculation to obtain a risk score of the URL access request, where the URL attack detection model is a machine learning model obtained through training based on the Isolation Forest machine learning algorithm; and determine whether the URL access request is a URL attack request based on the risk score.

According to the technical solutions provided in the implementations of the present specification, the features extracted from the URL access request are entered to the URL attack detection model obtained through training based on the Isolation Forest machine learning algorithm for prediction calculation, to perform attack detection on the URL access request. Therefore, a potential URL attack can be found in advance, thereby helping perform security protection in time for a potential abnormal URL access.

DESCRIPTION OF IMPLEMENTATIONS

Figure 1:
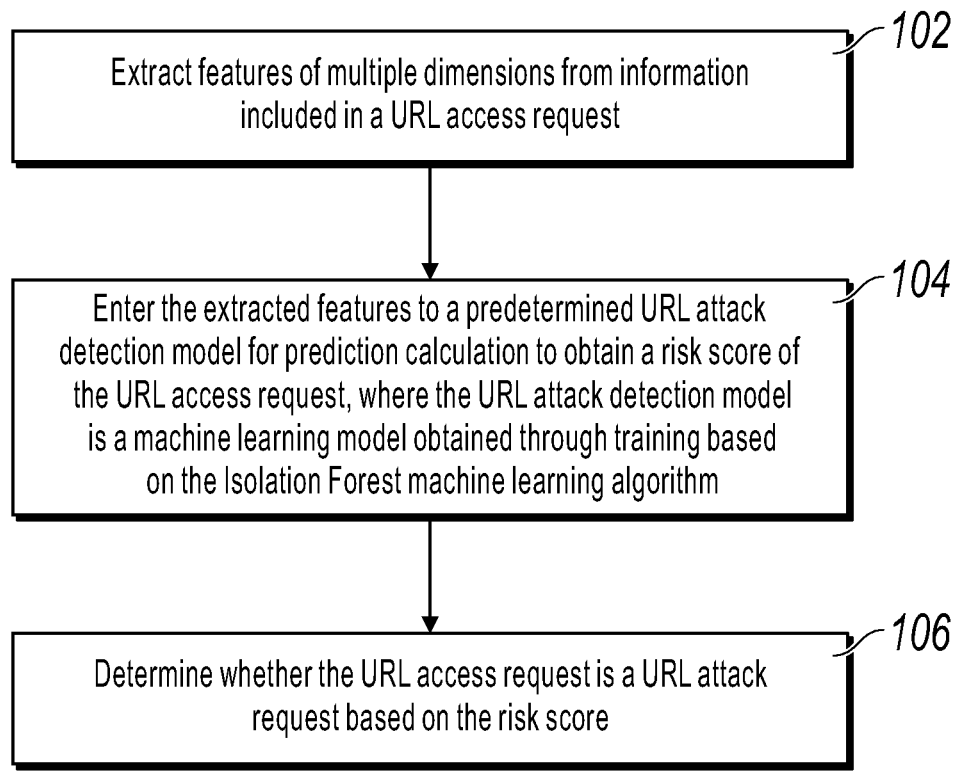
FIG. 1 is a flowchart illustrating a URL attack detection method, according to an implementation of the present specification.

The present specification aims to provide the following technical solutions: Based on the Isolation Forest machine learning algorithm, machine leaning training is performed on URL access request samples none of which are labeled with a risk label, to construct a URL attack detection model, and attack detection is performed on a normal URL access request by using the URL attack detection model, to find a potential URL attack.

During implementation, multiple URL access request samples can be prepared in advance, and none of the URL access request samples are labeled with a risk label. Then, data segmentation can be performed on the URL access request samples, and features of multiple dimensions can be extracted from information included in the URL access request samples.

For example, in practice, the information can specifically include domain name information and URL parameters. In this case, data segmentation can be performed on the URL access request samples to extract the domain name information (such as primary domain names and corresponding domain name suffixes) and the URL parameters (such as URL parameter names and corresponding parameter values) included in the URL access request samples, and then the features of the multiple dimensions can be extracted from the extracted domain name information and URL parameters.

Further, when the features of the multiple dimensions are separately extracted from the URL access request samples, the features can be normalized, and then normalized features can be used as modeling features to construct training samples.

After the training samples are constructed, the training samples can be trained based on the Isolation Forest machine learning algorithm, to construct a URL attack detection model. For example, binary tree classification can be performed on the training samples by using the Isolation Forest machine learning algorithm, to construct multiple random binary trees.

Finally, after the URL attack detection model is obtained through training, according to the same method, features of multiple dimensions can be separately extracted from information included in a URL access request that needs attack detection, a prediction sample can be constructed based on the extracted features, and the constructed prediction sample can be entered to the URL attack detection model for prediction calculation to obtain a risk score of the URL access request, and whether the URL access request is a URL attack request can be determined based on the risk score.

In the above technical solutions, the features extracted from the URL access request are entered to the URL attack detection model obtained through training based on the Isolation Forest machine learning algorithm for prediction calculation, to perform attack detection on the URL access request. Therefore, a potential URL attack can be found in advance, thereby helping perform security protection in time for a potential abnormal URL access.

The following describes the present specification by using specific implementations and with reference to specific application scenarios.

FIG. 1 shows a URL attack detection method, according to an implementation of the present specification. The following steps are performed:

Step 102: Extract features of multiple dimensions from information included in a URL access request.

Step 104: Enter the extracted features to a predetermined URL attack detection model for prediction calculation to obtain a risk score of the URL access request, where the URL attack detection model is a machine learning model obtained through training based on the Isolation Forest machine learning algorithm.

Step 106: Determine whether the URL access request is a URL attack request based on the risk score.

In the present specification, a modeler can collect a large quantity of unlabeled URL access requests as unlabeled samples in advance, construct a training sample set based on the collected unlabeled samples, and perform unsupervised machine learning training on the training sample set based on the Isolation Forest machine learning algorithm, to construct the URL attack detection model.

Figure 2:
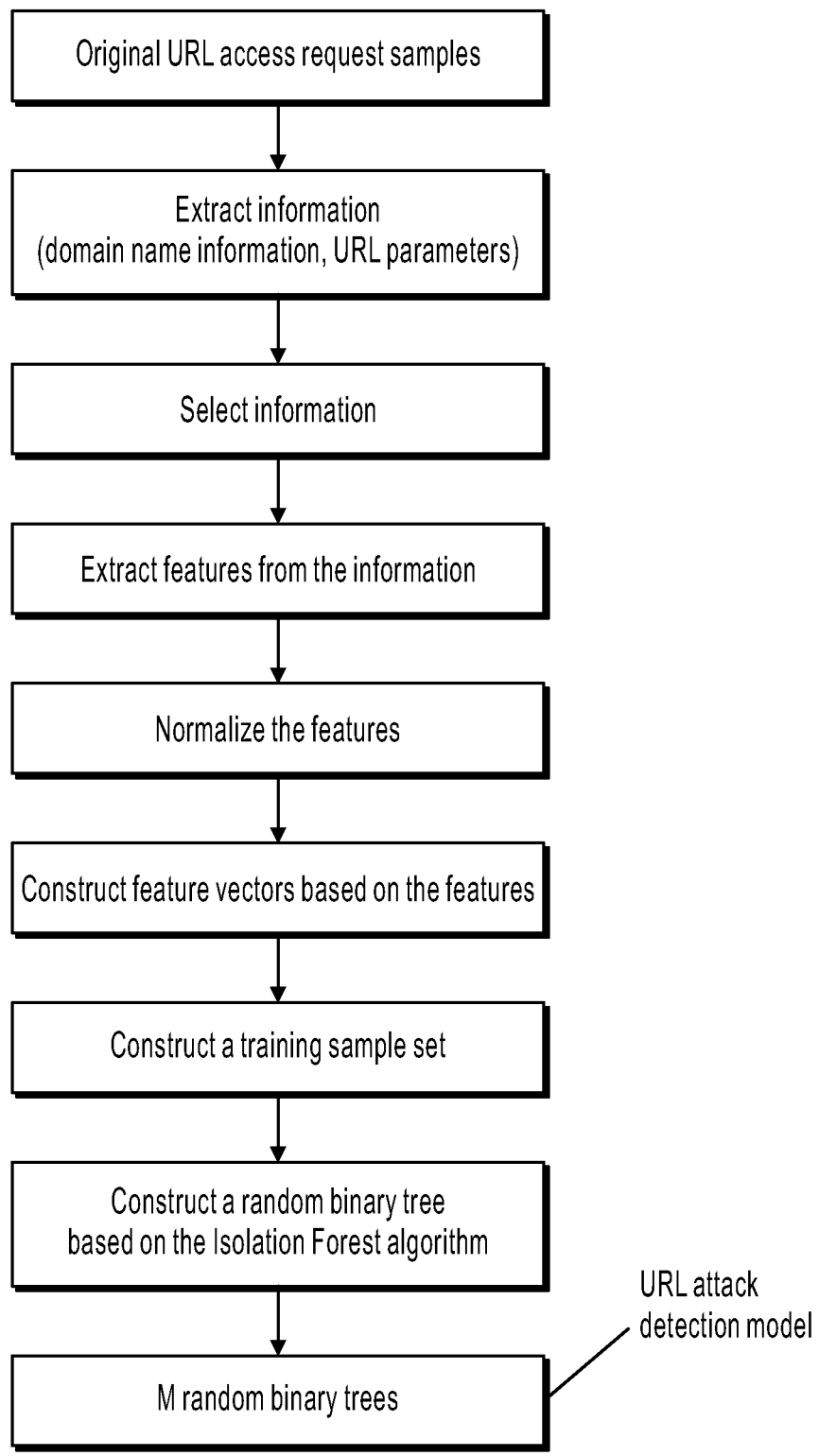
FIG. 2 is a diagram illustrating a process of constructing a training sample set to obtain an Isolation Forest model through training, according to an implementation of the present specification.

FIG. 2 is a diagram illustrating a process of constructing a training sample set to obtain an Isolation Forest model through training, according to the present specification.

As shown in FIG. 2, data segmentation can be first separately performed on collected and unlabeled original URL access request samples to extract information included in the URL access request samples.

The information included in the URL access requests is feature information that can be extracted from the URL access requests and can reflect whether the URL access requests are risky.

In a shown implementation, the information can specifically include URL parameters and domain name information included in the URL access requests. The URL parameters can include URL parameter names (ParamName) and corresponding parameter values (ParamValue). The domain name information can include primary domain names and domain name suffixes corresponding to the primary domain names.

For example, the information is the URL parameters included in the URL access requests. In this case, data segmentation can be performed on the original URL access request samples to extract the URL parameter names (ParamName) and the corresponding parameter values (ParamValue) included in the URL access request samples.

For another example, the information is the information included in the URL access requests. In this case, data segmentation can be performed on the original URL access request samples to extract the primary domain names and the domain name suffixes corresponding to the primary domain names included in the URL access requests. After the information included in the URL access request samples is extracted, a more common part of information in known URL attack requests can be selected from the information to construct the machine learning model. That is, information that can best represent features of the URL attack request can be selected from the information to participate in modeling.

For example, the information is the URL parameters included in the URL access requests. In this case, for a special URL parameter that appears only in an individual URL access request, the URL parameter can be filtered out because the URL parameter cannot really reflect a feature of the URL attack request.

For another example, the information is the information included in the URL access requests. In this case, for special information that appears only in an individual URL access request, the information can be filtered out because the information cannot really reflect a feature of the URL attack request and interferes with a modeling result when the information participates in modeling.

Further, for the selected information, features of multiple dimensions can be separately extracted from the information as modeling features.

It is worthwhile to note that, during modeling, the information extracted by the modeler from the URL access request samples can be specifically one of the domain name information and the URL parameters included in the URL access request samples, or both the domain name information and the URL parameters.

Therefore, in this case, the features extracted by the modeler from the information can be described in the following three cases:

In a first case, if the modeler uses the domain name information included in the URL access request samples as the information, the finally extracted features can include only features of multiple dimensions extracted from the domain name information included in the URL access request samples.

In a second case, if the modeler uses the URL parameters included in the URL access request samples as the information, the finally extracted features can include only features of multiple dimensions extracted from the URL parameters included in the URL access request samples.

In a third case, if the modeler uses both the URL parameters and the domain name information included in the URL access request samples as the information, and both the URL parameters and the domain name information participate in modeling in this case, the finally extracted features can include both features of multiple dimensions extracted from the URL parameters included in the URL access request samples and features of multiple dimensions extracted from the domain name information included in the URL access request samples. The features extracted from the information are not specially limited in the present specification. In practice, any form of feature that can represent information included in the URL attack request and a regular feature can be selected as modeling features.

For example, in practice, a person skilled in the art who participates in modeling can extract features of multiple dimensions from the information based on experience, and then attempt to construct a model based on the features, and evaluate a modeling result to select features of multiple dimensions that make the highest contribution to the model from the features as modeling features.

In a shown implementation, the features extracted from the information can include eight dimensions: a total quantity of characters of the information, a total quantity of letters of the information, a total quantity of numbers of the information, a total quantity of symbols of the information, a quantity of different characters of the information, a quantity of different letters of the information, a quantity of different numbers of the information, and a quantity of different symbols of the information.

For example, if the modeler uses the domain name information included in the URL access request samples as the information, the finally extracted features can include eight dimensions: a total quantity of characters of the domain name information, a total quantity of letters of the domain name information, a total quantity of numbers of the domain name information, a total quantity of symbols of the domain name information, a quantity of different characters of the domain name information, a quantity of different letters of the domain name information, a quantity of different numbers of the domain name information, and a quantity of different symbols of the domain name information.

If the modeler uses the URL parameters included in the URL access request samples as the information, the finally extracted features can include eight dimensions: a total quantity of characters of the URL parameter, a total quantity of letters of the URL parameter, a total quantity of numbers of the URL parameter, a total quantity of symbols of the URL parameter, a quantity of different characters of the URL parameter, a quantity of different letters of the URL parameter, a quantity of different numbers of the URL parameter, and a quantity of different symbols of the URL parameter.

If the modeler uses both the URL parameters and the domain name information included in the URL access request samples as the information, the finally extracted features can include 16 dimensions: a total quantity of characters of the URL parameter, a total quantity of letters of the URL parameter, a total quantity of numbers of the URL parameter, a total quantity of symbols of the URL parameter, a quantity of different characters of the URL parameter, a quantity of different letters of the URL parameter, a quantity of different numbers of the URL parameter, a quantity of different symbols of the URL parameter, a total quantity of characters of the domain name information, a total quantity of letters of the domain name information, a total quantity of numbers of the domain name information, a total quantity of symbols of the domain name information, a quantity of different characters of the domain name information, a quantity of different letters of the domain name information, a quantity of different numbers of the domain name information, and a quantity of different symbols of the domain name information.

It is worthwhile to note that in practice, a person skilled in the art may use a combination of the above eight basic dimensions as a modeling feature, or further select multiple dimensions from the above eight basic dimensions for combination as a modeling feature. Implementations are not specially limited in the present specification.

Certainly, the eight dimensions shown above are merely examples. Obviously, in practice, a person skilled in the art can also extract features of dimensions other than the eight dimensions from the information as modeling features. The other dimensions are not listed one by one in the present specification.

Still referring to FIG. 2, after the features of the multiple dimensions are separately extracted from the selected information, because value ranges of different features may be different, the features of the dimensions can be further normalized, and value ranges of different features are normalized to a uniform value range, to eliminate impact of different feature value ranges on modeling accuracy.

After the extracted features are normalized, a corresponding feature vector can be constructed for each URL access request sample as a training sample based on features extracted from information included in the URL access request sample. Dimensions of the constructed feature vector are the same as the dimensions of the extracted features.

After the corresponding feature vector is constructed for each URL access request sample, a target matrix can be constructed based on the feature vector constructed for each URL access request sample. For example, assume that a total of N URL access request samples are collected and features of M dimensions are extracted from each URL access request sample, the target matrix can be specifically an N*M-dimensional target matrix.

In this case, the constructed target matrix is a training sample set that finally participates in training for the machine learning model.

Still referring to FIG. 2, after the training sample set is trained, the training samples can be trained based on the Isolation Forest machine learning algorithm, to construct the URL attack detection model. The Isolation Forest algorithm is an algorithm of mining an abnormal data sample from an original data set by constructing multiple random binary trees. The random binary tree is constructed based on a randomly generated classification feature and a randomly generated classification threshold value corresponding to a value of the classification feature. That is, during construction of the random binary tree, both the used classification feature and the used classification threshold value corresponding to the value of the classification feature are randomly generated.

A process of training the constructed training sample set based on the Isolation Forest algorithm to construct the URL anomaly detection model is a process of classifying the training samples in the training sample set based on the Isolation Forest algorithm to construct M random binary trees.

In an initial state, before training the training sample set based on the Isolation Forest algorithm, the modeler needs to perform parameter configuration for the Isolation Forest algorithm, to configure the quantity M of random binary trees that need to be constructed and a quantity N of training samples that need to be sampled from the training sample set during construction of a single random binary tree for the Isolation Forest algorithm.

Values of M and N can be engineering experience values, or can be self-defined based on an actual demand of the modeler. For example, by default, for the Isolation Forest algorithm, 100 random binary trees need to be constructed and 256 training samples need to be sampled for each random binary tree.

After the modeler completes the parameter configuration for the Isolation Forest algorithm, the modeler can run the Isolation Forest algorithm on a set-up computing platform (for example, a server cluster) to train the constructed training sample set, to construct the final URL anomaly detection model.

The following describes in detail the process of classifying the training samples in the training sample set based on the Isolation Forest algorithm to construct the random binary trees.

First, the training sample set can be uniformly sampled M times based on the N value configured by the modeler. The "uniformly sampled" means that the same quantity of training samples are sampled from the training sample set each time during the M times of sampling.

After the uniform training sample sampling, M training sample subsets can be constructed based on sampled training samples, and then training samples in each training sample subset are classified, to construct the M random binary trees.

Further, when training samples in a training sample subset are classified to construct a random binary tree, first, a feature can be randomly selected as a classification feature for the training sample subset from the features of the multiple dimensions that constitute the training sample, and the classification feature can be used as a root node; and the maximum value and the minimum value of the classification feature in the current training sample subset can be determined, and then a classification threshold value can be randomly selected for the training sample subset from a value range between the maximum value and the minimum value.

After the classification feature used as the root node and the classification threshold value are selected, first-level classification can be performed for the training sample subset, that is, values of the classification feature of the training samples in the training sample subset are separately compared with the classification threshold value; and then based on a comparison result, the training samples in the training sample subset are classified into two types: training samples whose values of the classification feature are greater than the classification threshold value and training samples whose values of the classification feature are less than the classification threshold value, and the two types of training samples obtained through classification are separately used as leaf nodes of the root node.

For example, during implementation, the training samples whose values of the classification feature are less than the classification threshold value in the training sample subset can be classified under a left tree branch of the binary tree, and this type of training samples can be used as a left leaf node of the root node in the binary tree; and the training samples whose values of the classification feature are greater than the classification threshold value in the training sample subset can be classified under a right tree branch of the binary tree, and this type of training samples can be used as a right leaf node of the root node in the binary tree.

In this case, the first-level classification for the training sample subset is completed.

Further, after the first-level classification, second-level classification for the training sample subset can be continued.

In this case, the training samples in the two leaf nodes obtained through classification can be separately used as new training sample subsets, and then the above classification process is iteratively executed for the new training sample subsets until training samples in each obtained leaf node are no longer classifiable.

For example, still according to the same method, a classification feature and a classification threshold value can be randomly selected for each new training sample subset; and then training samples in each new training sample subset can be classified into two types: training samples whose values of the classification feature are greater than the classification threshold value and training samples whose values of the classification feature are less than the classification threshold value, and the two types of training samples obtained through classification can be separately used as lower-level leaf nodes of the upper-level leaf nodes. By analogy, the classification continues until training samples in a lower-level leaf node obtained after certain-level classification are no longer classifiable. For example, when only one training sample is left in the leaf node, or the training samples in the leaf node are identical, it indicates that the training samples in the obtained leaf node are no longer classifiable.

It is worthwhile to note that, different classification features need to be randomly selected for the root node and sub-nodes of various levels. For example, in an implementation, after a certain feature is selected as a classification feature of a certain node in the random binary tree, the feature can be removed, and subsequently, when a classification feature is selected for another node, the classification feature can be randomly selected from features other than the feature.

In addition, a stopping condition of the above shown iterative classification of the Isolation Forest algorithm can be, by default, that the training samples in the obtained leaf node are no longer classifiable. In practice, the modeler can also configure the maximum binary tree depth (the maximum quantity of layers of nodes from the root node) for the obtained random binary tree when configuring algorithm parameters for the Isolation Forest algorithm. In this case, the stopping condition can be as follows: The algorithm can be immediately stopped when a depth of the random binary tree obtained through the iterative classification process reaches the maximum binary tree depth configured for the algorithm (training samples in each leaf node obtained in this case may still be classifiable).

The above shows a process of iteratively classifying training samples in one of the training sample subsets to construct a single random binary tree.

Similarly, the above classification process can be repeated for each training sample subset. Finally, the M random binary trees can be constructed based on the M training sample subsets. In this case, training for the training sample set is completed, and the obtained M random binary trees are the finally constructed URL anomaly detection model.

In the present specification, after the URL attack detection model is obtained through training, according to the same feature extraction method shown in FIG. 2, information can be extracted from a URL access request that needs attack detection, information can be selected from the extracted information, features of multiple dimensions (consistent with the features in the model training stage) can be extracted from the selected information, a prediction sample can be constructed based on the extracted features, and the prediction sample can be entered to the URL attack detection model for prediction calculation to obtain a risk score of the URL access request.

The following describes in detail a process of obtaining a risk score of a URL access request by using the URL attack detection model obtained through training.

When a risk score of a constructed prediction sample is calculated, a path depth $h(x)$ of the prediction sample in each random binary tree first needs to be estimated.

Specifically, starting from a root node of each random binary tree, the entire random binary tree can be traversed from top to bottom based on a value of each feature in the prediction sample to find a leaf node corresponding to the prediction sample in the random binary tree.

For example, a value corresponding to a classification feature of the root node in the prediction sample can be first determined, and then a first-level leaf node that the prediction sample belongs to can be found based on the value. After the first-level leaf node is found, a value corresponding to a classification feature of the first-level leaf node in the prediction sample can be further determined, and then a second-level leaf node that the prediction sample belongs to can be found based on the value. By analogy, level-by-level traversal continues until the leaf node corresponding to the prediction sample is found.

After the leaf node corresponding to the prediction sample is found, a quantity e of edges that have passed through from the root node to the found leaf node in a process of traversing the random binary tree and a quantity n of training samples in the leaf node corresponding to the prediction sample can be recorded.

In this case, the finally obtained path depth $h(x)$ can be represented by using the following equation:

$$h(x)=e+C(n), \text{ where}$$

C(n) is a modified value and can be represented by the following equation:

$$C(n) = 2H(n-1) - \frac{2(n-1)}{n},$$

where

H(n−1) can be estimated by using ln(n−1)+ 0.5772156649, and the constant here is Euler-Mascheroni constant.

After the path depth h(x) of the prediction sample in each random binary tree is estimated by using the above equation, an average value of path depths of the prediction sample in all the random binary trees can be further calculated, and then the obtained average value is normalized to quantify the calculation result between 0 and 1, to obtain the risk score of the URL access request.

The finally obtained risk score can be represented by using the following equation:

$$\text{Score}(x) = 2\frac{-E\{h(x)\}}{C(\varphi)}$$

Score(x) represents a final risk score of prediction sample X, E{h(x)} represents a path depth h(x) of the prediction sample in each random binary tree, φ represents a quantity of training samples of a single random binary tree, and C(φ) represents an average path length of binary trees each constructed by using φ training samples and is used to normalize a calculation result in the above equation.

After the risk score of the URL access request is predicted by using the URL attack detection model, whether the URL access request is a URL attack request can be further determined based on the URL risk score.

For example, in an implementation, the risk score can be compared with a predetermined risk threshold to determine a specific type of the URL access request. If the risk score is greater than or equal to the predetermined risk threshold, it indicates that the URL access request is a URL attack request. On the contrary, if the risk score is less than the predetermined risk threshold, it indicates that the URL access request is a normal URL access request.

It can be learned from the above implementations that, in the present specification, the features extracted from the URL access request are entered to the URL attack detection model obtained through training based on the Isolation Forest machine learning algorithm for prediction calculation, to perform attack detection on the URL access request.

As such, a potential URL attack can be found in advance, thereby helping perform security protection in time for a potential abnormal URL access.

In addition, because the Isolation Forest algorithm is an unsupervised machine learning algorithm and training samples needed during model training can no longer need to be labeled with sample labels, large manpower costs caused by labeling the training samples can be saved for the modeler.

Figure 3:
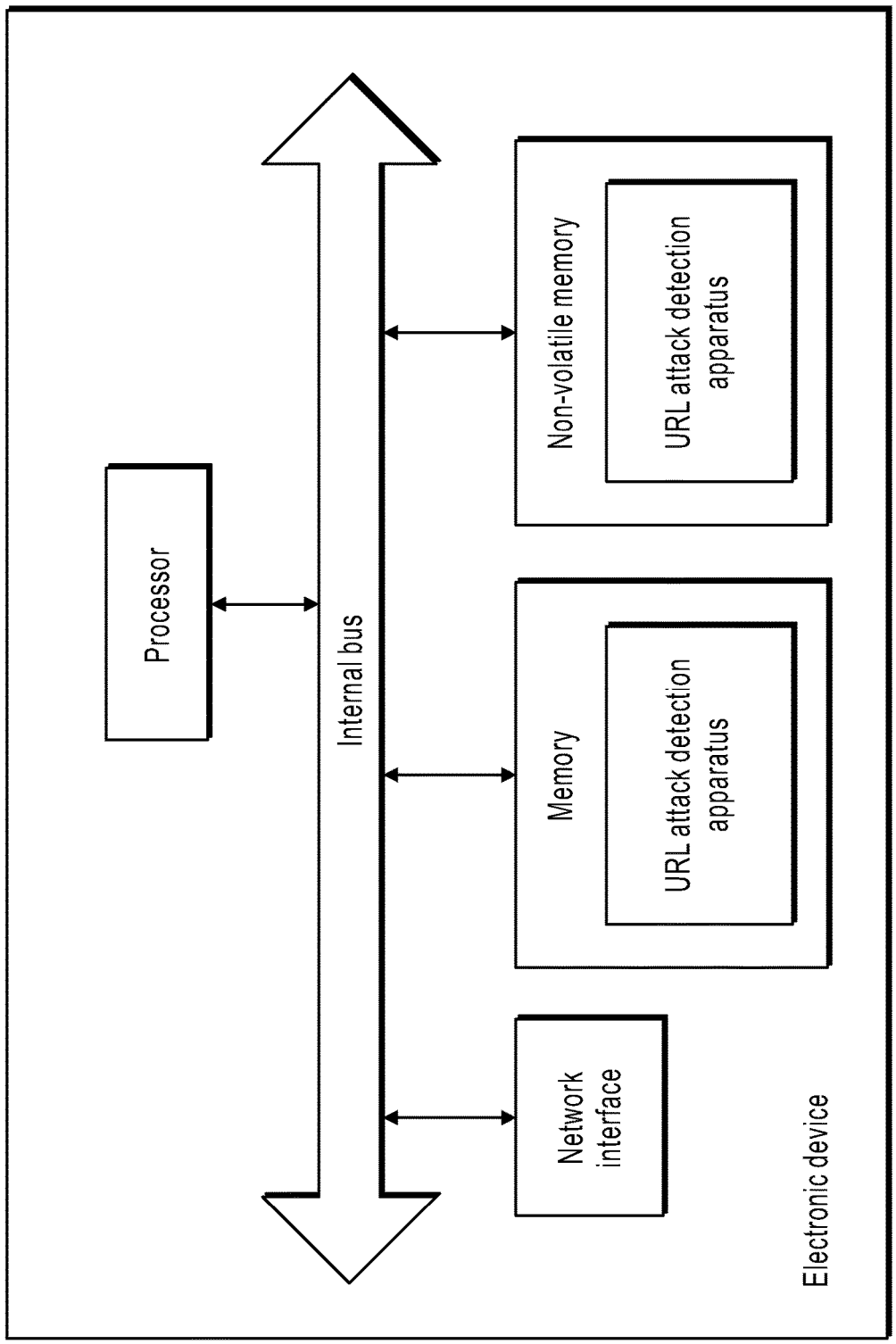
FIG. 3 is a diagram illustrating a hardware structure of an electronic device including a URL attack detection apparatus, according to an implementation of the present specification.

Corresponding to the above method implementation, the present specification further provides an implementation of a URL attack detection apparatus. The implementation of the URL attack detection device of the present specification is applicable to an electronic device. The apparatus implementation can be implemented by using software, hardware, or a combination of software and hardware. Software implementation is used as an example. As a logical apparatus, the apparatus is formed by reading a corresponding computer program instruction from a non-volatile memory to a memory by a processor of an electronic device where the apparatus is located. In terms of hardware, FIG. 3 is a diagram illustrating a hardware structure of the electronic device where the URL attack detection apparatus is located, according to the present specification. In addition to a processor, a memory, a network interface, and a non-volatile memory that are shown in FIG. 3, the electronic device where the apparatus is located in the implementation can usually further include other hardware based on actual functions of the electronic device. Details are omitted.

Figure 4:
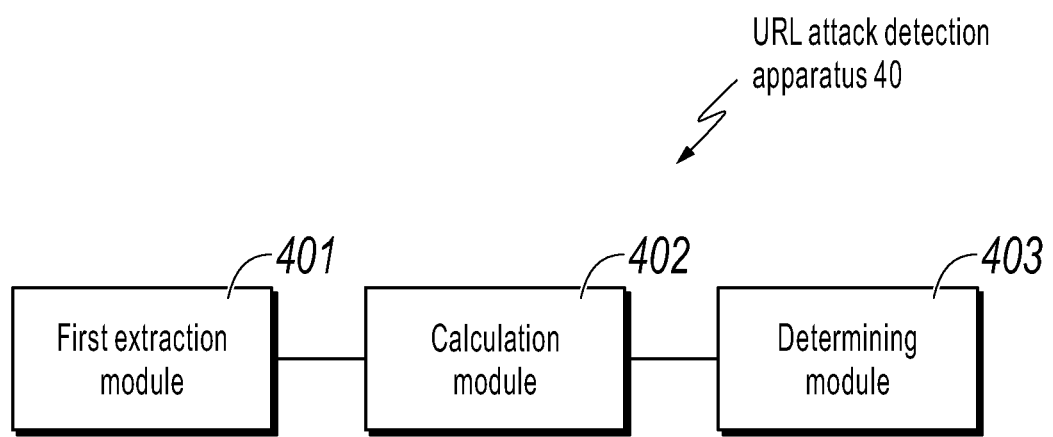
FIG. 4 is a logical block diagram illustrating a URL attack detection apparatus, according to an implementation of the present specification.

FIG. 4 is a block diagram illustrating a URL attack detection apparatus, according to an example implementation of the present specification.

Referring to FIG. 4, URL attack detection apparatus 40 is applicable to the electronic device shown in FIG. 3, and includes first extraction module 401, calculation module 402, and determining module 403.

First extraction module 401 is configured to extract features of multiple dimensions from information included in a URL access request.

Calculation module 402 is configured to enter the extracted features to a predetermined URL attack detection model for prediction calculation to obtain a risk score of the URL access request, where the URL attack detection model is a machine learning model obtained through training based on the Isolation Forest machine learning algorithm.

Determining module 403 is configured to determine whether the URL access request is a URL attack request based on the risk score.

In this implementation, apparatus 40 further includes: second extraction module 404 (not shown in FIG. 4), configured to separately extract features of multiple dimensions from information included in multiple URL access request samples, where none of the multiple URL access request samples are labeled with a sample label; construction module 405 (not shown in FIG. 4), configured to construct multiple training samples based on the extracted features; and training module 406 (not shown in FIG. 4), configured to train using the multiple training samples based on the Isolation Forest machine learning algorithm to obtain the URL attack detection model.

In this implementation, the URL attack detection model includes M random binary trees obtained through training based on the Isolation Forest machine learning algorithm; and training module 406 is configured to: construct M training sample subsets based on training samples uniformly sampled from the multiple training samples; randomly select a classification feature for each training sample subset from the features of the multiple dimensions as a root node, and randomly select a classification threshold value for each training sample subset from a value range between the maximum value and the minimum value of the classification feature; separately classify training samples whose values of the classification feature are greater than the classification threshold value and training samples whose values of the classification feature are less than the classification threshold value in each training sample set under leaf nodes of the root node; and use training samples in each leaf node as a new training sample subset to iteratively execute the above classification process until training samples in each obtained leaf node are no longer classifiable.

In this implementation, calculation module 402 is configured to: construct a prediction sample based on the extracted features; traverse each random binary tree from a root node based on a value of each feature in the prediction sample to find a leaf node corresponding to the prediction sample; and calculate an average value of path depths of found leaf nodes in all the random binary trees, and normalize the average value to obtain the risk score of the URL access request.

In this implementation, the information includes domain name information and/or a URL parameter; and the features of the multiple dimensions include features extracted from the domain name information included in the URL access request and/or features extracted from the URL parameter included in the URL access request.

In this implementation, the features include a combination of multiple of the following features: a total quantity of characters, a total quantity of letters, a total quantity of numbers, a total quantity of symbols, a quantity of different characters, a quantity of different letters, a quantity of different numbers, and a quantity of different symbols.

For a specific implementation process of a function of each module in the apparatus, references can be made to an implementation process of a corresponding step in the above method. Details are omitted here.

Because an apparatus implementation basically corresponds to a method implementation, for a related part, references can be made to some descriptions in the method implementation. The above described apparatus implementation is merely an example. The units described as separate parts may or may not be physically separate, and parts displayed as units may or may not be physical units, that is, may be located in one position, or may be distributed on multiple network units. Some or all of the modules can be selected based on an actual demand to achieve the objectives of the solutions of the present specification. A person of ordinary skill in the art can understand and implement the implementations of the present application without creative efforts.

The system, apparatus, module, or unit illustrated in the above implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

Corresponding to the above method implementation, the present specification further provides an implementation of an electronic device. The electronic device includes a processor and a memory configured to store a machine executable instruction. The processor and the memory are usually connected to each other by using an internal bus. In another possible implementation, the device may further include an external interface, so that the device can communicate with other devices or components.

In this implementation, by reading and executing a machine executable instruction that corresponds to control logic of URL attack detection and that is stored in the memory, the processor is prompted to: extract features of multiple dimensions from information included in a URL access request; enter the extracted features to a predetermined URL attack detection model for prediction calculation to obtain a risk score of the URL access request, where the URL attack detection model is a machine learning model obtained through training based on the Isolation Forest machine learning algorithm; and determine whether the URL access request is a URL attack request based on the risk score.

In this implementation, by reading and executing the machine executable instruction that corresponds to the control logic of URL attack detection and that is stored in the memory, the processor is further prompted to: separately extract features of multiple dimensions from information included in multiple URL access request samples, where none of the multiple URL access request samples are labeled with a sample label; construct multiple training samples based on the extracted features; and train using the multiple training samples based on the Isolation Forest machine learning algorithm to obtain the URL attack detection model.

In this implementation, the URL attack detection model includes M random binary trees obtained through training based on the Isolation Forest machine learning algorithm; and by reading and executing the machine executable instruction that corresponds to the control logic of URL attack detection and that is stored in the memory, the processor is further prompted to: construct M training sample subsets based on training samples uniformly sampled from the multiple training samples; randomly select a classification feature for each training sample subset from the features of the multiple dimensions as a root node, and randomly select a classification threshold value for each training sample subset from a value range between the maximum value and the minimum value of the classification feature; separately classify training samples whose values of the classification feature are greater than the classification threshold value and training samples whose values of the classification feature are less than the classification threshold value in each training sample set under leaf nodes of the root node; and use training samples in each leaf node as a new training sample subset to iteratively execute the above classification process until training samples in each obtained leaf node are no longer classifiable.

In this implementation, by reading and executing the machine executable instruction that corresponds to the control logic of URL attack detection and that is stored in the memory, the processor is further prompted to: construct a prediction sample based on the extracted features; traverse each random binary tree from a root node based on a value of each feature in the prediction sample to find a leaf node corresponding to the prediction sample; and calculate an average value of path depths of found leaf nodes in all the random binary trees, and normalize the average value to obtain the risk score of the URL access request.

In this implementation, the information includes domain name information and/or a URL parameter; and the features of the multiple dimensions include features extracted from the domain name information included in the URL access request and/or features extracted from the URL parameter included in the URL access request.

In this implementation, the extracted features of the multiple dimensions include a combination of multiple of the following features: a total quantity of characters of the information, a total quantity of letters of the information, a total quantity of numbers of the information, a total quantity of symbols of the information, a quantity of different characters of the information, a quantity of different letters of the information, a quantity of different numbers of the information, and a quantity of different symbols of the information.

A person skilled in the art can easily figure out other implementations of the present specification after thinking over the present specification and practicing the invention disclosed here. The present specification is intended to cover any variations, uses, or adaptations of the present specification, and these variations, uses, or adaptations follow the general principles of the present specification and include common knowledge or conventional techniques in this technical field that are not disclosed in the present specification. The present specification and the implementations are merely considered as examples, and the actual scope and the spirit of the present specification are pointed out by the following claims.

It should be understood that the present specification is not limited to the precise structures that have been described above and shown in the accompanying drawings, and various modifications and changes can be made without departing from the scope of the present specification. The scope of the present specification is limited only by the appended claims.

The above descriptions are merely preferred implementations of the present specification, but are not intended to limit the present specification. Any modification, equivalent replacement, improvement, etc. made without departing from the spirit and principle of the present specification shall fall within the protection scope of the present specification.

What is claimed is:

1. A computer-implemented method for URL attack detection, wherein the method comprises:
   extracting a set of features of multiple dimensions from information comprised in a plurality of URL access request samples, wherein none of the plurality of URL access request samples are labeled;
   constructing a plurality of training samples based on the set of features;
   obtaining a URL attack detection model by using the plurality of training samples and based on an Isolation Forest machine learning algorithm, comprising:
      obtaining M training sample subsets from the plurality of training samples; and
      constructing M random binary trees, wherein each one of the M random binary trees corresponds to a particular training sample subset of the M training sample subsets, and wherein constructing a random binary tree comprises:
         while a stopping condition is not satisfied:
            selecting a classification feature randomly from dimensions of features as a root node,
            selecting a classification threshold value randomly between the maximum value of the classification feature and the minimum value of the classification feature among all training samples comprised in the particular training sample subset,
            determining a first set of training samples comprised in the particular training sample subset whose values of the classification feature are greater than or equal to the classification threshold value as a first leaf node of the root node and determining a second set of training samples comprised in the particular training sample subset whose values of the classification feature are less than the classification threshold value as a second leaf node of the root node, and
            setting the first set of training samples or the second set of training samples as the particular training sample subset;
   extracting features of multiple dimensions from information comprised in a URL access request;
   obtaining a risk score of the URL access request by providing the features to the URL attack detection model for prediction calculation, wherein the URL attack detection model is a machine learning model obtained through training based on the Isolation Forest machine learning algorithm; and
   determining, based on the risk score, that the URL access request is a URL attack request.

2. The method according to claim 1, wherein the stopping condition comprises at least one of:
   the particular training sample subset is no longer classifiable; or
   a depth of the random binary tree reaches a predetermined maximum binary tree depth.

3. The method according to claim 1 wherein obtaining the risk score of the URL access request comprises:
   constructing a prediction sample based on the features;
   for each particular random binary tree of the M random binary trees:
      finding a leaf node corresponding to the prediction sample by traversing the particular random binary tree from a root node of the particular random binary tree;
   calculating an average value of path depths of the found leaf nodes in the M random binary trees; and
   obtaining the risk score of the URL access request by normalizing the average value.

4. The method according to claim 1, wherein the information comprises at least one of domain name information or a URL parameter, and wherein the features of multiple dimensions comprise at least one of:
   features extracted from the domain name information comprised in the URL access request; or
   features extracted from the URL parameter comprised in the URL access request.

5. The method according to claim 4, wherein the features comprise at least two of: a total quantity of characters, a total quantity of letters, a total quantity of numbers, a total quantity of symbols, a quantity of distinct characters, a quantity of distinct letters, a quantity of distinct numbers, or a quantity of distinct symbols.

6. A non-transitory, computer-readable medium storing one or more instructions executable by a computer system to perform operations comprising:
   extracting a set of features of multiple dimensions from information comprised in a plurality of URL access request samples, wherein none of the plurality of URL access request samples are labeled;
   constructing a plurality of training samples based on the set of features;
   obtaining a URL attack detection model by using the plurality of training samples and based on an Isolation Forest machine learning algorithm, comprising:
      obtaining M training sample subsets from the plurality of training samples; and
      constructing M random binary trees, wherein each one of the M random binary trees corresponds to a particular training sample subset of the M training sample subsets, and wherein constructing a random binary tree comprises:
         while a stopping condition is not satisfied:
            selecting a classification feature randomly from dimensions of features as a root node,
            selecting a classification threshold value randomly between the maximum value of the classification feature and the minimum value of the classification feature among all training samples comprised in the particular training sample subset, determining a first set of training samples comprised in the particular training sample subset whose values of the classification feature are greater than or equal to the classification threshold value as a first leaf node of the root node and determining a second set of training samples comprised in the particular training sample subset whose values of the classification feature are less than the classification threshold value as a second leaf node of the root node, and setting the first set of training samples or the second set of training samples as the particular training sample subset;

extracting features of multiple dimensions from information comprised in a URL access request;

obtaining a risk score of the URL access request by providing the features to the URL attack detection model for prediction calculation, wherein the URL attack detection model is a machine learning model obtained through training based on the Isolation Forest machine learning algorithm; and determining, based on the risk score, that the URL access request is a URL attack request.

7. The non-transitory, computer-readable medium according to claim 6, wherein the stopping condition comprises at least one of:

the particular training sample subset is no longer classifiable; or a depth of the random binary tree reaches a predetermined maximum binary tree depth.

8. The non-transitory, computer-readable medium according to claim 6, wherein obtaining the risk score of the URL access request comprises:

constructing a prediction sample based on the features;

for each particular random binary tree of the M random binary trees:

finding a leaf node corresponding to the prediction sample by traversing the particular random binary tree from a root node of the particular random binary tree;

calculating an average value of path depths of the found leaf nodes in the M random binary trees; and obtaining the risk score of the URL access request by normalizing the average value.

9. The non-transitory, computer-readable medium according to claim 6, wherein the information comprises at least one of domain name information or a URL parameter, and wherein the features of multiple dimensions comprise at least one of:

features extracted from the domain name information comprised in the URL access request; or features extracted from the URL parameter comprised in the URL access request.

10. The non-transitory, computer-readable medium according to claim 9, wherein the features comprise at least two of: a total quantity of characters, a total quantity of letters, a total quantity of numbers, a total quantity of symbols, a quantity of distinct characters, a quantity of distinct letters, a quantity of distinct numbers, or a quantity of distinct symbols.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

extracting a set of features of multiple dimensions from information comprised in a plurality of URL access request samples, wherein none of the plurality of URL access request samples are labeled;

constructing a plurality of training samples based on the set of features;

obtaining a URL attack detection model by using the plurality of training samples and based on an Isolation Forest machine learning algorithm, comprising:

obtaining M training sample subsets from the plurality of training samples; and constructing M random binary trees, wherein each one of the M random binary trees corresponds to a particular training sample subset of the M training sample subsets, and wherein constructing a random binary tree comprises:

while a stopping condition is not satisfied:

selecting a classification feature randomly from dimensions of features as a root node, selecting a classification threshold value randomly between the maximum value of the classification feature and the minimum value of the classification feature among all training samples comprised in the particular training sample subset, determining a first set of training samples comprised in the particular training sample subset whose values of the classification feature are greater than or equal to the classification threshold value as a first leaf node of the root node and determining a second set of training samples comprised in the particular training sample subset whose values of the classification feature are less than the classification threshold value as a second leaf node of the root node, and setting the first set of training samples or the second set of training samples as the particular training sample subset;

extracting features of multiple dimensions from information comprised in a URL access request;

obtaining a risk score of the URL access request by providing the features to the URL attack detection model for prediction calculation, wherein the URL attack detection model is a machine learning model obtained through training based on the Isolation Forest machine learning algorithm; and determining, based on the risk score, that the URL access request is a URL attack request.

12. The computer-implemented system according to claim 11, wherein the stopping condition comprises at least one of:

the particular training sample subset is no longer classifiable; or a depth of the random binary tree reaches a predetermined maximum binary tree depth.

13. The computer-implemented system according to claim 11, wherein obtaining the risk score of the URL access request comprises:

constructing a prediction sample based on the features;

for each particular random binary tree of the M random binary trees:

finding a leaf node corresponding to the prediction sample by traversing the particular random binary tree from a root node of the particular random binary tree;

calculating an average value of path depths of the found leaf nodes in the M random binary trees; and obtaining the risk score of the URL access request by normalizing the average value.

14. The computer-implemented system according to claim 11, wherein the information comprises at least one of domain name information or a URL parameter, and wherein the features of multiple dimensions comprise at least one of:

features extracted from the domain name information comprised in the URL access request; or features extracted from the URL parameter comprised in the URL access request.

15. The computer-implemented system according to claim 14, wherein the features comprise at least two of: a total quantity of characters, a total quantity of letters, a total quantity of numbers, a total quantity of symbols, a quantity of distinct characters, a quantity of distinct letters, a quantity of distinct numbers, or a quantity of distinct symbols.

* * * * *